(12) United States Patent
Utsuno et al.

(10) Patent No.: US 11,264,642 B2
(45) Date of Patent: Mar. 1, 2022

(54) SULFIDE SOLID ELECTROLYTE

(71) Applicant: IDEMITSU KOSAN CO., LTD., Chiyoda-ku (JP)

(72) Inventors: Futoshi Utsuno, Sodegaura (JP); Kota Terai, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 235 days.

(21) Appl. No.: 16/324,267

(22) PCT Filed: Aug. 8, 2017

(86) PCT No.: PCT/JP2017/028838
§ 371 (c)(1),
(2) Date: Feb. 8, 2019

(87) PCT Pub. No.: WO2018/030436
PCT Pub. Date: Feb. 15, 2018

(65) Prior Publication Data
US 2019/0221884 A1    Jul. 18, 2019

(30) Foreign Application Priority Data
Aug. 10, 2016  (JP) .............................. JP2016-157888

(51) Int. Cl.
*H01M 10/0562*  (2010.01)
*H01M 10/0525*  (2010.01)
(Continued)

(52) U.S. Cl.
CPC .......... *H01M 10/0562* (2013.01); *H01B 1/06* (2013.01); *H01B 1/10* (2013.01);
(Continued)

(58) Field of Classification Search
CPC ................................................. H01M 10/0562
See application file for complete search history.

(56) References Cited

U.S. PATENT DOCUMENTS 9,899,702 B2    2/2018  Miyashita et al.
2010/0290969 A1  11/2010  Deiseroth et al.
(Continued)

FOREIGN PATENT DOCUMENTS

CN    105098229 A    11/2015
CN    105098230 A    11/2015
(Continued)

OTHER PUBLICATIONS

Extended European Search Report dated Jan. 8, 2020 in European Patent Application No. 17839504.2, 8 pages.
(Continued)

*Primary Examiner* — Stephan J Essex
(74) *Attorney, Agent, or Firm* — Oblon, McClelland, Maier & Neustadt, L.L.P.

(57) ABSTRACT

A sulfide solid electrolyte containing lithium, phosphorus, sulfur; and one or more of elements X selected from the group consisting of halogen elements and chalcogen elements excluding sulfur, wherein the sulfide solid electrolyte includes an argyrodite-type crystal structure, and wherein a molar ratio of the lithium to the phosphorus, a (Li/P), a molar ratio of the sulfur to the phosphorus, b (S/P), and a molar ratio of the element X to the phosphorus, c (X/P), satisfy formulas (1) to (3): $5.0 \leq a \leq 7.1$ (1) $1.0 < a-b \leq 1.5$ (2) $6.5 \leq a+c < 7.1$ (3) wherein $b > 0$ and $c > 0$ are satisfied.

22 Claims, 1 Drawing Sheet

(51) Int. Cl.
- *H01M 4/62* (2006.01)
- *H01B 1/06* (2006.01)
- *H01B 1/10* (2006.01)
- *H01M 10/052* (2010.01)

(52) U.S. Cl.
CPC ........... *H01M 4/62* (2013.01); *H01M 10/052* (2013.01); *H01M 10/0525* (2013.01); *H01M 2300/0068* (2013.01)

(56) References Cited

U.S. PATENT DOCUMENTS

| | | |
|---|---|---|
| 2015/0333368 A1 | 11/2015 | Kato et al. |
| 2016/0156064 A1 | 6/2016 | Miyashita et al. |
| 2017/0162901 A1* | 6/2017 | Chen ................ H01M 10/0525 |
| 2017/0222257 A1 | 8/2017 | Miyashita et al. |
| 2017/0352916 A1 | 12/2017 | Miyashita et al. |

FOREIGN PATENT DOCUMENTS

| | | |
|---|---|---|
| CN | 105229841 A | 1/2016 |
| CN | 105518923 A | 4/2016 |
| JP | 2010-540396 A | 12/2010 |
| JP | 2015-220013 A | 12/2015 |
| JP | 2016-24874 A | 2/2016 |
| JP | 2016-134316 | 7/2016 |
| JP | 2018-45997 A | 3/2018 |
| WO | WO 2015/011937 A1 | 1/2015 |
| WO | WO 2015/012042 A1 | 1/2015 |
| WO | WO 2016/009768 A1 | 1/2016 |
| WO | WO 2016/104702 A1 | 6/2016 |

OTHER PUBLICATIONS

International Search Report dated Oct. 10, 2017 in PCT/JP2017/028838, 2 pages.

English translation of the International Preliminary Report on Patentability and Written Opinion of the International Searching Authority dated Feb. 21, 2019 in PCT/ JP2017/028838 filed Aug. 8, 2017, 6 pages.

Hans-Jög Deiseroth, et al., "Li6PS5X: A Class of Crystalline Li-Rich Solids with an Unusually High Li+ Mobility" Angewandte Chemie, vol. 47, No. 4, 2008, pp. 755-758 with cover page.

R. P. Rao, et al., "Studies of Lithium Argyrodite Solid Electrolytes for All-Solid-State Batteries" Physica Status Solidi A, vol. 208, No. 8, 2011, pp. 1804-1807 with cover page.

Sylvain Boulineau, et al., "Mechanochemical Synthesis of Li-Argyrodite Li6PS5X (X=Cl, Br, I) as Sulfur-Based Solid Electrolytes for all Solid State Batteries Application" Solid State Ionics, vol. 221, 2012, pp. 1-5 with cover.

Notice of Opposition to Patent dated Oct. 12, 2020 and in Japanese Patent Application No. 6679730 (with English translation), 29 pages.

CN Office Action dated Sep. 2, 2021, issued in CN application No. 201780048970.0, filed Aug. 8, 2017.

* cited by examiner

SULFIDE SOLID ELECTROLYTE

TECHNICAL FIELD

The invention relates to a sulfide solid electrolyte, an electrode mix and a lithium ion battery.

BACKGROUND ART

In recent years, with rapid spread of information-related equipment or communication equipment such as personal computers, video cameras, mobile phones, etc., development of a battery used as the power source thereof has been considered to be important. Among the batteries, a lithium ion battery has attracted attention due to its high energy density.

In a lithium ion battery that is currently commercially available, since a liquid electrolyte comprising a flammable organic solvent is used, attachment of a safety device that suppresses an increase in temperature at the time of short circuit or improvement in structure and material in order to avoid occurrence of short circuit is required. On the other hand, since a lithium ion battery obtained by allowing a battery to be totally solid by using a solid electrolyte instead of an electrolyte solution does not use a flammable organic solvent in a battery, it is considered that simplification of a safety device can be attained and that it is excellent in production cost and productivity.

As the solid electrolyte used in a lithium ion battery, a sulfide solid electrolyte is known. As the crystal structure of a sulfide solid electrolyte, various structures are known. As one of such crystal structures, an argyrodite crystal structure is known (Patent Literatures 1 to 5, Non-Patent Literatures 1 to 3).

Argyrodite crystal structures are highly stable, and some of the structures have a high ion conductivity. However, development of a production method which enables mass production and further improvement in ion conductivity are required,

CITATION LIST

Patent Literature

Patent Literature 1: JP-T-2010-540396
Patent Literature 2: WO2015/011937
Patent Literature 3: WO2015/012042
Patent Literature 4: JP-A-2016-24874
Patent Literature 5: WO2016/104702

Non-Patent Literatures

Non-Patent Literature 1: Angew. Chem Vol. 47 (2008), No. 4, P. 755-758
Non-Patent Literature 2: Phys. Status. Solidi Vol. 208 (2011), No. 8, P. 1804-1807
Non-Patent Literature 3: Solid State Ionics Vol. 221 (2012) P. 1-5

SUMMARY OF THE INVENTION

One object of the invention is to provide a novel sulfide solid electrolyte comprising an argyrodite-type crystal structure and having a high ion conductivity.

According to one embodiment of the invention, provided is a sulfide solid electrolyte comprising lithium, phosphorus, sulfur and one or more of elements X selected from the group consisting of halogen elements and chalcogen elements excluding sulfur, wherein the sulfide solid electrolyte comprises an argyrodite-type crystal structure, and a molar ratio of the lithium to the phosphorus, a (Li/P), a molar ratio of the sulfur to the phosphorus, b (S/P), and a molar ratio of the element X to the phosphorus, c (X/P), satisfy formulas (1) to (3):

$$5.0 \leq a \leq 7.1 \tag{1}$$

$$1.0 < a-b \leq 1.5 \tag{2}$$

$$6.5 \leq a+c < 7.1 \tag{3}$$

wherein b>0 and c>0 are satisfied.

According to one embodiment of the invention, it is possible to provide a novel sulfide solid electrolyte comprising an argyrodite-type crystal structure and having a high ion conductivity.

EMBODIMENTS FOR CARRYING OUT THE INVENTION

Figure 1:
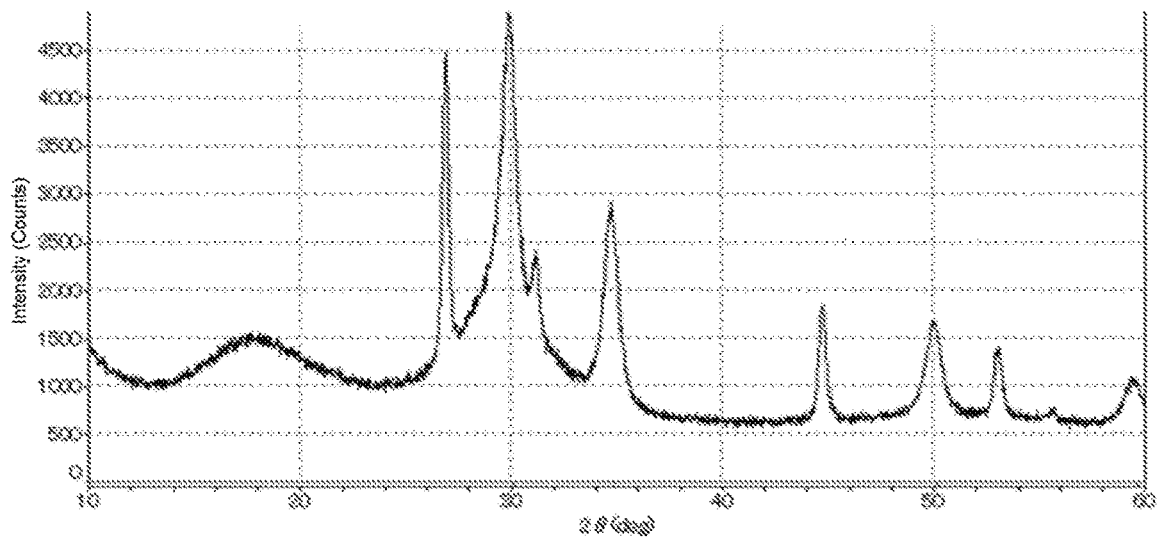
FIG. 1 is an X-ray diffraction pattern of an intermediate obtained in Example 1.

The sulfide solid electrolyte according to one embodiment of the invention comprises lithium, phosphorus, sulfur and one or more of elements X selected from the group consisting of halogen elements and chalcogen elements excluding sulfur, and characterized in that a molar ratio of the lithium to the phosphorus, a (Li/P), a molar ratio of the sulfur to the phosphorus, b (S/P), and a molar ratio of the element X to the phosphorus, c (X/P), satisfy formulas (1) to (3):

$$5.0 \leq a \leq 7.1 \tag{1}$$

$$1.0 < a-b \leq 1.5 \tag{2}$$

$$6.5 \leq a+c < 7.1 \tag{3}$$

wherein b>0 and c>0 are satisfied.

The stoichiometric composition of a sulfide solid electrolyte comprising common argyrodite crystals is represented by $Li_{7-x}PS_{6-x}X_x$. The sulfide solid electrolyte of this embodiment has a composition different from a normal composition. When deviation in composition of S is taken as α and deviation in composition of X is taken as β, the composition of the sulfide solid electrolyte of this embodiment is represented by $Li_{7-x}PS_{6-x+\alpha}X_{x+\beta}$. In this case, a−b in formula (2) is a−b=7−x−(6−x+α)=1−α. a−b is a value correlated with the deviation in composition of S. a+c in formula (3) is a+c=7−x+x+β=7+β. a+c is a value correlated with the deviation in composition of X.

1.0<a−b≤1.5 in formula (2) becomes 1:0<1−α≤1.5. When the formula is further modified, it becomes −0.5≤α<0. That is, the sulfide solid electrolyte of this embodiment is a sulfide solid electrolyte in which S (sulfur) is partly vacant as compared with a sulfide solid electrolyte that comprises common argyrodite crystals.

Oxygen (O), selenium (Se), tellurium (Te) or the like can be given as the chalcogen elements excluding sulfur.

As the halogen element, F, Cl, Br, I or the like can be given.

Formula (2) is preferably 1.0<a−b≤1.4, with 1.0<a−b≤1.3 being more preferable.

Formula (3) is preferably 6.7≤a+c<7.1, with 6.855≤a+c<7.1 being more preferable.

In the sulfide solid electrolyte of this embodiment, when formula (1) is satisfied, formula (2) is 1.0<a−b≤1.5 and formula (3) is 6.5≤a+c<7.1, the ion conductivity is 5.1 mS/cm or more. When formula (1) is satisfied, formula (2) is 1.0<a−b≤1.4 and formula (3) is 6.7≤a+c<7.1, the ion conductivity can be higher, i.e. 5.8 mS/cm or more. Further, when formula (1) is satisfied, formula (2) is 1.0<a−b≤1.3 and formula (3) is 6.855a+c<7.1, the ion conductivity can be further higher, i.e. 6.9 mS/cm or more.

The molar ratio or composition of each element in the sulfide solid electrolyte can be measured by the inductively coupled plasma atomic emission spectroscopy. The method for measuring by the inductively coupled plasma atomic emission spectroscopy is described in the Examples.

The molar ratio of each element can be controlled by adjusting the content of each element in the raw material.

As the ionic radius of the element X is smaller, the amount of the element X comprised in the argyrodite-type crystal structure increases and the ion conductivity becomes higher. Therefore, it is preferred that the molar ratio "a" of the lithium to the phosphorus be adjusted by the ionic radius of the element X. The element X can be classified into the following three groups ($X_1$, $X_2$, and $X_3$) depending on the ionic radius.

$X_1$: F, Cl, and O
$X_2$: Br
$X_3$: I, Se, and Te

In the element X, when the molar ratio of element $X_1$ is largest, it is preferred that formula (1) be 5.2≤a≤6.5, with 5.25≤a≤6.4 being more preferable. When the molar ratio of element $X_2$ is largest in the element X, it is preferred that formula (1) be 5.2≤a≤6.8, with 5.3≤a≤6.6 being more preferable. Further, in the element X, when the molar ratio of element $X_3$ is largest, it is preferred that formula (1) be 5.5≤a≤7.0, with 5.5≤a≤6.8 being more preferable.

The element X preferably consists solely of one or more of halogen elements.

The above-mentioned phosphorus is an element which constitutes the framework structure of the sulfide solid electrolyte.

The sulfide solid electrolyte of this embodiment comprises an argyrodite-type crystal structure. The sulfide solid electrolyte may be partly or completely of an argyrodite-type crystal structure.

For example, presence of diffraction peaks at 2θ=25.2±0.5 deg and 29.7±0.5 deg by powder X-ray diffraction measurement using CuKα rays makes it possible to determine that the sulfide solid electrolyte of this embodiment has an argyrodite-type crystal structure. The diffraction peaks at 2θ=25.2±0.5 deg and 29.7±0.5 deg are peaks derived from an argyrodite-type crystal structure. The argyrodite-type crystal structure is a structure in which $PS_4^{3-}$ is present as the unit structure of the main framework, around which a sulfur element (S) or a halogen element (X) surrounded by a lithium element (U) is located.

The diffraction peak of an argyrodite-type crystal structure may appear at 2θ=15.3±0.5 deg, 17.7±0.5 deg, 31.1±0.5 deg, 44.9±0.5 deg and 47.7±0.5 deg, for example. The sulfide solid electrolyte of this embodiment may have these peaks.

In the present application, the position of the diffraction peak is judged to be A±0.5 deg assuming that the median value is A. The position is preferably A±0.3 deg. For example, in the case of the above-mentioned diffraction peak of 2θ=25.2±0.5 deg, the median value A is 25.2 deg and is preferably present in a range of 2θ=25.2±0.3 deg. The same can be applied to judgement of all of the other diffraction peak positions in the present application.

As the argyrodite-type crystal structure, crystal structures disclosed in Non-Patent Literatures 1 to 3, JP-T-2010-540396, JP-A-2011-096630 and JP-A-2013-211171 can be given, for example.

The sulfide solid electrolyte of this embodiment may contain a crystal structure other than the argyrodite-type crystal structure. In general, in a sulfide solid electrolyte, various crystal components and amorphous components are present in mixture. In this embodiment, a sulfide solid electrolyte comprising a crystal structure is a sulfide solid electrolyte for which a peak derived from a sulfide solid electrolyte is observed in an X-ray diffraction pattern in an X-ray diffractometry. Further, there may also be a case that remaining raw material is contained.

The sulfide solid electrolyte of this embodiment may comprise elements such as Si, Ge, Sn, Pb, B, Al, Ga, As, Sb and Bi in addition to the lithium, the phosphorus, the sulfur and the element X. When the sulfide solid electrolyte comprises one or more of elements M selected from the group consisting of Si, Ge, Sn, Pb, B, Al, Ga, As, Sb and Bi, the molar ratio of each element in the above-mentioned (1) to (3) is a molar ratio relative to the total of the element M and phosphorus. For example, the molar ratio of the lithium to the phosphorus, a (Li/P), is Li/(P+M).

It is preferred that the sulfide solid electrolyte of this embodiment satisfy, for example, the composition represented by formula (4):

$$Li_a(P_{1-z}M_z)S_bX_c \quad (4)$$

wherein M is one or more of elements selected from the group consisting of Si, Ge, Sn, Pb, B, Al, Ga, As, Sb and Bi, and X is one or more of elements selected from the group consisting of F, Cl, Br, I, O, Se and Te. a to c satisfy formulas (1) to (3). z satisfies 0≤z≤0.3.

If the molar ratio of the above-mentioned element $X_1$ relative to the entire X is largest in formula (4), a is preferably 5.2≤a≤6.5, with 5.25≤a≤6.4 being more preferable. If the molar ratio of the element $X_2$ is largest, a is preferably 5.2≤a≤6.8, with 5.35≤a≤6.6 being more preferable. If the molar ratio of the element $X_3$ is largest, a is preferably 5.5≤a≤7.0, with 5.5≤a≤6.8 being more preferable.

X of formula (4) is preferably one or more of halogen elements selected from F, Cl, Br and I, whereby the halogen element is incorporated into the argyrodite-type crystal structure and the ionic conductivity becomes high. If two or more of halogen elements are comprised, the amount ratio of each element is not limited.

z is preferably 0.

In addition, it is preferred that the sulfide solid electrolyte of this embodiment not have a diffraction peak (not a diffraction peak derived from an argyrodite-type crystal structure) at 2θ=17.6±0.4 deg and 2θ=18.1±0.4 deg in powder X-ray diffraction using CuKα rays. If it has the diffraction peak at these positions, it is preferred that the sulfide solid electrolyte satisfy formula (5):

$$0 < I_A/I_B < 0.05 \quad (5)$$

wherein $I_A$ represents the intensity of the diffraction peak which is not a diffraction peak derived from the argyrodite-type crystal structure between diffraction peaks at $2\theta=17.6\pm0.4$ deg and $2\theta=18.1\pm0.4$ deg, and $I_B$ represents the intensity of the diffraction peak at $2\theta=29.7\pm0.5$ deg.

The crystal structure specified by $I_A$ (hereinafter referred to as the Li$_3$PS$_4$ crystal structure) has a low ion conductivity, and hence lowers ion conductivity of the solid electrolyte. Formula (5) shows that the amount of the Li$_3$PS$_4$ crystal structure is relatively low as compared with the amount of the argyrodite-type crystal structure. Formula (5) is more preferably $0<I_A/I_B<0.03$, with $0<I_A/I_B<0.02$ being further preferable.

There may be case where either $2\theta=17.6\pm0.4$ deg or $2\theta=18.1\pm0.4$ deg cannot be measured since it overlaps the diffraction peak of the argyrodite-type crystal structure that has a relatively strong peak intensity. Therefore, "the diffraction peak which is not a diffraction peak of the argyrodite-type crystal structure between diffraction peaks at $2\theta=17.6\pm0.4$ deg and $2\theta=18.1\pm0.4$ deg" usually means one having a weaker Intensity between these two peaks measured.

The sulfide solid electrolyte of this embodiment can be produced by a production method comprising a step in which a mixture of raw materials mentioned later is reacted by applying a mechanical stress to prepare an intermediate and a step in which the intermediate is heat-treated for crystallization.

As the raw materials used, two or more of compounds or elementary substances comprising, as a whole, elements to be comprised as essential components in a sulfide solid electrolyte to be produced, i.e. lithium, phosphorus, sulfur, and the element (X), are used in combination.

Examples of the raw material comprising lithium include lithium compounds such as lithium sulfide (Li$_2$S), lithium oxide (Li$_2$O), lithium carbonate (Li$_2$CO$_3$), elementary lithium metal, and the like. Among them, a lithium compound is preferable, with lithium sulfide being more preferable.

The above-mentioned lithium sulfide can be used without any limitations, but preferably has a high purity. Lithium sulfide can be produced by the methods described in e.g. JP-A-H07-330312, JP-A-H09-283156, JP-A-2010-163356, and JP-A-2011-84438.

Specifically, lithium sulfide can be synthesized by reacting lithium hydroxide and hydrogen sulfide in a hydrocarbon-based organic solvent at 70° C. to 300° C. to generate lithium hydrosulfide, and subsequently removing hydrogen sulfide from the reaction liquid (JP-A-2010-163356).

In addition, lithium sulfide can be synthesized by reacting lithium hydroxide and hydrogen sulfide in a water solvent at 10° C. to 100° C. to generate lithium hydrosulfide, and subsequently removing hydrogen sulfide from the reaction liquid (JP-A-2011-84438).

Examples of the raw material comprising phosphorus include phosphorus compounds such as phosphorus sulfide such as phosphorus trisulfide (P$_2$S$_3$) and phosphorus pentasulfide (P$_2$S$_5$), and sodium phosphate (Na$_3$PO$_4$); and elementary phosphorus, or the like. Among these, phosphorus sulfide is preferable, with phosphorus pentasulfide (P$_2$S$_5$) being more preferable. Phosphorus compounds such as phosphorus pentasulfide (P$_2$S$_5$), and elementary phosphorus can be used without any limitations if they are industrially produced and commercially available.

As the raw material comprising the element X, it is preferred that the raw material comprises a halogen compound represented by formula (6), for example.

$$M_l\text{---}X_m \quad (6)$$

In formula (6), M is sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi) or those in which an oxygen element or a sulfur element are bonded to these elements, and lithium (Li) or phosphorus (P) is preferable, with lithium (U) being more preferable.

X is a halogen element selected from the group consisting of fluorine (F), chlorine (Cl), bromine (Br) and iodine (I).

l is an integer of 1 or 2 and m is an integer of 1 to 10. When m is an integer of 2 to 10, that is, when plural Xs are present, the Xs may be the same or different. For example, in the case of SiBrCl$_3$ mentioned later, m is 4, and X is formed of different elements, i.e. Br and Cl.

As the halogen compound represented by formula (6), specifically, sodium halide such as NaI, NaF, NaCl and NaBr lithium halide such as LiF, LiCl, LiBr and LiI; boron halide such as BCl$_3$, BBr$_3$ and BI$_3$; aluminum halide such as AlF$_3$, AlBr$_3$, AlCl$_3$ and AlCl$_3$; silicon halide such as SiF$_4$, SiCl$_4$, SiCl$_3$, Si$_2$Cl$_6$, SiBr$_4$, SiBrCl$_3$, SiBr$_2$Cl$_2$ and SiI$_4$; phosphorus halide such as PF$_3$, PF$_5$, PCl$_3$, PCl$_5$, POCl$_3$, PBr$_3$, POBr$_3$, PI$_3$, P$_2$Cl$_4$ and P$_2$I$_4$; sulfur halide such as SF$_2$, SF$_4$, SF$_6$, S$_2$F$_{10}$, SCl$_2$, S$_2$Cl$_2$ and S$_2$Br$_2$; germanium halide such as GeF$_4$, GeCl$_4$, GeBr$_4$, GeI$_4$, GeF$_2$, GeCl$_2$, GeBr$_2$ and GeI$_2$; arsenic halide such as AsF$_3$, AsCl$_3$, AsBr$_3$, AsI$_3$ and AsF$_5$; selenium halide such as SeF$_4$, SeF$_6$, SeCl$_2$, SeCl$_4$, Se$_2$Br$_2$ and SeBr$_4$; tin halide such as SnF$_4$, SnCl$_4$, SnBr$_4$, SnI$_4$, SnF$_2$, SnCl$_2$, SnBr$_2$ and SnI$_2$; antimony halide such as SbF$_3$, SbCl$_3$, SbBr$_3$, SbI$_3$, SbF$_6$ and SbCl$_5$; tellurium halide such as TeF$_4$, Te$_2$F$_{10}$, TeF$_6$, TeCl$_2$, TeCl$_4$, TeBr$_2$, TeBr$_4$ and TeI$_4$; lead halide such as PbF$_4$, PbCl$_4$, PbF$_2$, PbCl$_2$, PbBr$_2$ and PbI$_2$; bismuth halide such as BiF$_3$, BiCl$_3$, BiBr$_3$ and BiI$_3$, and the like can be given.

Among these, lithium halides such as lithium chloride (LiCl), lithium bromide (LiBr) and lithium iodide (LiI), and phosphorous halides such as phosphorus pentachloride (PCl$_5$), phosphorus trichloride (PCl$_3$), phosphorus pentabromide (PBr$_5$) and phosphorus tribromide (PBr$_3$) can preferably be given. Among these, lithium halides such as LiCl, LiBr and LiI, and PBr$_3$ are preferable, with lithium halides such as LiCl, LiBr and LiI being more preferable, with LiCl and LiBr being further preferable.

As the halogen compound, one of the above-mentioned compounds may be used singly, or two or more may be used in combination. That is, at least one of the above-mentioned compounds can be used. Further, in this case, as for the halogen element, one selected from the above-mentioned halogen elements can be used singly or two or more selected from the above-mentioned halogen elements can be used in combination.

In this embodiment, it is preferred that the raw materials comprise a lithium compound, a phosphorus compound and a halogen compound, and at least one of the lithium compound and the phosphorus compound comprises a sulfur element. Combination of lithium sulfide, phosphorus sulfide and lithium halide is more preferable, with combination of lithium sulfide, phosphorus pentasulfide and lithium halide being further preferable.

In this embodiment, a mechanical stress is applied to the above-mentioned raw materials to allow them to react, thereby allowing them to be an intermediate. Here, the "applying a mechanical stress" means that shear force, impact strength, etc. are mechanically applied. As means for applying a mechanical stress, a pulverizer such as a planetary ball mill, a vibration mill and a rolling mill, and a kneader, etc. can be given.

In the conventional technology (for example, Patent Literature 2, etc.), pulverization and mixing are carried out to such an extent that the crystallinity of the raw material powder can be maintained. On the other hand, in this embodiment, it is preferable that the raw materials be subjected to a mechanical stress and reacted, thereby to obtain an intermediate comprising a glass component That is, by a mechanical stress higher than that used in the conventional technology, pulverization and mixing are conducted to such a state that at least part of the raw material powder cannot maintain crystallinity. As a result, in the stage of an Intermediate, a $PS_4$ structure that is a basic framework structure of the argyrodite-type crystal structure can be generated and a halogen can be highly dispersed. As a result, in the heat-treatment as the next step, when the argyrodite-type crystal structure that is a stable phase is formed, a halogen is incorporated into the argyrodite-type crystal structure easily. Further, it is assumed that a low ion conductivity phase such as a $Li_3PS_4$ crystal structure is hard to be formed because phases of each region are not different. As a result, the sulfide solid electrolyte of this embodiment is assumed to express a high ion conductivity.

Presence of a glass (amorphous) component in an intermediate can be confirmed by the presence of a broad peak (hallo pattern) derived from an amorphous component in an XRD measurement.

Further, in the case of the sulfide solid electrolyte of this embodiment, since there is no need to heat the raw material at 550° C. for 6 days as in the case of Patent Literature 1, mass-productivity is high.

The sulfide solid electrolyte having a high ion conductivity is a sulfide solid electrolyte in which lithium easily moves in an argyrodite-type crystal structure. The sulfide solid electrolyte of this embodiment is a sulfide solid electrolyte in which S (sulfur) is partly vacant and it is assumed that the vacancy of S occurs in the non-crosslinked anion site of the argyrodite-type crystal structure. Presence of the above-mentioned vacancy leads to a decrease in the amount of lithium in the argyrodite-type crystal structure and causes lithium to be easily dispersed so that a high ion conductivity can be obtained.

When a sulfide solid electrolyte comprising an argyrodite-type crystal structure is produced directly from a raw material without passing through an intermediate comprising glass components, it is difficult to obtain a sulfide solid electrolyte having a high ion conductivity. The reason therefor is as follows. When a sulfide solid electrolyte is produced directly from a raw material, S (sulfur) is easily scattered during heat treatment and unreacted lithium halide easily remains. As a result of unreacted lithium halide remaining, no halogen enters the argyrodite-type crystal structure and a low conductivity phase such as a $Li_3PS_4$ phase is easily deposited in the sulfide solid electrolyte obtained.

The production of a glass component-containing intermediate and the mixing of the materials at the atomic level make it possible to prevent a low conductivity phase from being deposited without scattering of S and even without unreacted lithium halide remaining during the heat treatment of the glass component-containing intermediate.

As the condition of pulverization and mixing, for example, when a planetary ball mill is used as a pulverizer, the rotation speed may be from several tens to several hundreds of revolution/minute and may be treated for 0.5 hour to 100 hours. More specifically, in the case of the planetary ball mill (Model No. P-7, manufactured by Fritsch Co.) used in the examples of the present application, the rotation speed of the planetary ball mill is preferably 350 rpm or more and 400 rpm or less, more preferably 360 rpm or more and 380 rpm or less.

For example, when a ball made of zirconia is used as the pulverization media, its diameter is preferably 0.2 to 20 mm.

The intermediate prepared by pulverization and mixing is heat-treated in an inert gas atmosphere such as nitrogen, argon and the like. The heat treatment temperature is preferably 350 to 650° C., more preferably 400 to 550° C.

In the conventional technology (for example, Patent Literatures 2 to 5), a raw material mixture is baked under a hydrogen sulfide stream. Since sulfur is complemented thereby when baking, sulfur deficiency due to heating is thought to be suppressed. In this embodiment, on the other hand, a heat treatment can be conducted in the absence of hydrogen sulfide. In this case, it is thought that the sulfur content becomes lower than that of a sulfide solid electrolyte of the conventional technology and that sulfur deficiency occurs in the crystal structure so that a sulfide solid electrolyte having a high ion conductivity can be obtained.

For example, when lithium sulfide, phosphorus pentasulfide, and lithium halide are used as the raw materials of the sulfide solid electrolyte of this embodiment, the molar ratio of the charged raw materials can be lithium sulfide:phosphorus pentasulfide:lithium halide=37 to 88:8 to 25:0.1 to 50. After a mechanical stress is applied to these raw materials to allow them to react to obtain an intermediate, by conducting a heat treatment in the absence of hydrogen sulfide as mentioned above, it is possible to obtain the sulfide solid electrolyte of this embodiment satisfying formulas (1) to (3).

The sulfide solid electrolyte of this embodiment satisfying formulas (1) to (3) can also be obtained by adjusting the type and molar ratio of the charged raw materials. An example thereof can be given in which, when phosphorus sulfide is used, phosphorus trisulfide ($P_2S_3$) is used instead of part or all of phosphorus pentasulfide ($P_2S_5$). In addition, the use of an elementary phosphorus (P) as a phosphorus source, the use of metal lithium (Li) as a lithium source, etc. are conceivable. In every case, from the stoichiometric ratio calculated from the three raw materials of $Li_2S$, $P_2S_5$ and LiX, the amount of sulfur is relatively decreased.

The sulfide solid electrolyte of this embodiment can be used in a solid electrolyte layer, a positive electrode, a negative electrode, etc. of a lithium ion secondary battery, etc.

[Electrode Mixes]

The electrode mixes according to one embodiment of the invention comprise the above-described sulfide solid electrolyte of the invention and an active material, or are produced from the sulfide solid electrolyte of the invention. The electrode mix according to one embodiment of the invention becomes a negative electrode mix when a negative electrode active material is used as the active material and, on the other hand, becomes a positive electrode mix when a positive electrode active material is used.

Negative Electrode Mix

A negative electrode mix is obtained by blending the sulfide solid electrolyte of the invention with a negative electrode active material.

As the negative electrode active material, e.g. carbon materials, metal materials, etc. can be used, and complexes consisting of two or more of these materials can also be used. In addition, negative electrode active materials to be developed in the future can also be used.

Further, the negative electrode active material preferably has electron conductivity.

Examples of the carbon materials include graphite (e.g. artificial graphite), graphite carbon fiber, resin-baked carbon, pyrolytic vapor-phase grown carbon, coke, mesocarbon microbead (MCMB), furfuryl alcohol resin-baked carbon, polyacene, pitch-based carbon fiber, vapor-phase grown carbon fiber, natural graphite, and non-graphitizable carbon.

As the metal materials, elementary metals, alloys, and metal compounds can be given. Examples of the above-mentioned elementary metals are metal silicon, metallic tin, metallic lithium, metallic indium, and metallic aluminum. Examples of the above-mentioned alloys are alloys comprising at least one of silicon, tin, lithium, Indium, and aluminum. As the above-mentioned metal compounds, metal oxides can be given. Examples of metal oxides are silicon oxide, tin oxide, and aluminum oxide.

The blending ratio of negative electrode active material to solid electrolyte is preferably negative electrode active material:solid electrolyte=95% by weight:5% by weight to 5% by weight:95% by weight, more preferably 90% by weight:10% by weight to 10% by weight:90% by weight, and further preferably 85% by weight:15% by weight to 15% by weight:85% by weight.

When the content of the negative electrode active material in the negative electrode mix is too low, the electric capacity becomes lower. In addition, when the negative electrode active material has electron conductivity and comprises no conductive additive or only a small amount of a conductive additive, there is thought to be a risk that the electron conductivity (electron conduction path) in the negative electrode will decrease and the rate property will decrease, and that the utilization rate of the negative electrode active material will decrease and the electric capacity will decrease. On the other hand, when the content of the negative electrode active material in the negative electrode mix is too high, there is thought to be a risk that the ion conductivity (ion conduction path) in the negative electrode will decrease and the rate property will decrease, and that the utilization rate of the negative electrode active material will decrease and the electric capacity will decrease.

The negative electrode mix can further comprise a conductive additive.

When the negative electrode active material has a low electronic conductivity, it Is preferable to add a conductive additive. The conductive additive suffices to have conductivity and the electronic conductivity thereof is preferably $1 \times 10^3$ S/cm or more, and more preferably $1 \times 10^5$ S/cm or more.

Specific examples of the conductive additive are preferably substances comprising at least one of element selected from the group consisting of carbon materials, nickel, copper, aluminum, indium, silver, cobalt, magnesium, lithium, chromium, gold, ruthenium, platinum, beryllium, iridium, molybdenum, niobium, osmium, rhodium, tungsten, and zinc, and more preferably an elementary carbon having a high conductivity and carbon materials other than an elementary carbon; and elementary metals, mixtures or compounds comprising nickel, copper, silver, cobalt, magnesium, lithium, ruthenium, gold, platinum, niobium, osmium or rhodium.

In addition, specific examples of the carbon materials include carbon black such as Ketjen black, acetylene black, denka black, thermal black, and channel black; and graphite, carbon fiber, and activated carbon, which can be used singly or in combination of two or more. Among them, acetylene black, denka black, and Ketjen black having a high electron conductivity are preferable.

In the case where the negative electrode mix comprises a conductive additive, the content of the conductive additive in the mix is preferably 1 to 40% by weight, and more preferably 2 to 20% by weight. If the content of the conductive additive is too low, there is thought to be a risk that the electron conductivity of the negative electrode will decrease and the rate property will decrease, and that the utilization rate of the negative electrode active material will decrease and the electric capacity will decrease. On the other hand, if the content of the conductive additive is too high, the amount of the negative electrode active material and/or the amount of the solid electrolyte decrease(s). It is presumed that the electric capacity decreases when the amount of the negative electrode active material decreases. Further, if the amount of the solid electrolyte decreases, there is thought to be a risk that the ion conductivity of the negative electrode will decrease and the rate property will decrease, and that the utilization rate of the negative electrode active material will decrease and the electric capacity will decrease.

In order to tightly bind the negative electrode active material and the solid electrolyte to each other, a binder may be further comprised.

As the binder, fluorine-containing resins such as polytetrafluoroethylene (PTFE), polyvinylidene fluoride (PVDF) and fluorine rubber, or thermoplastic resins such as polypropylene and polyethylene, ethylene-propylene-diene rubber (EPDM), sulfonated EPDM, natural butyl rubber (NBR), etc. can be used singly or as a mixture of two or more. It is also possible to use e.g. a water dispersion of cellulose-based substance or styrene butadiene rubber (SBR) which is a water-based binder.

The negative electrode mix can be produced by mixing a solid electrolyte and a negative electrode active material, and an optional conductive additive and/or an optional binder.

The mixing method is not limited, but it is possible to apply e.g. dry mixing in which the mixing is conducted by using a mortar, a ball mill, a beads mil, a jet mill, a planetary ball mill, a vibrating ball mill, a sand mill or a cutter mill; and wet mixing in which raw materials are dispersed in an organic solvent and then the mixing is performed by using a mortar, a ball mill, a beads mill, a planetary ball mill, a vibrating ball mill, a sand mill or a film mix, followed by removing the solvent. Among them, wet mixing is preferable due to destroying no negative electrode active material particles.

Positive Electrode Mix

A positive electrode mix is obtained by blending the solid electrolyte of the invention with a positive electrode active material.

Positive electrode active materials are materials capable of inserting or eliminating a lithium ion into or from the material, and those known as positive electrode active materials in the field of batteries can be used. In addition, positive electrode active materials to be developed in the future can also be used.

As the positive electrode active material, e.g. metal oxides, sulfides, etc. can be given. The sulfides include metal sulfides and non-metal sulfides.

The metal oxides are, for example, transition metal oxides. Specific examples thereof include $V_2O_5$, $V_6O_{13}$, $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $Li(Ni_aCo_bMn_c)O_4$ ($0<a<2$, $0<b<2$, $0<c<2$, and $a+b+c=2$), $LiMn_{2-Z}Ni_ZO_4$, $LiMn_{2-Z}Co_ZO_4$ (where $0<Z<2$), $LiCoPO_4$, $LiFePO_4$, $CuO$, and $Li(Ni_aCo_bAl_c)O_2$ (where $0<a<1$, $0<b<1$, $0<c<1$, and $a+b+c=1$).

Examples of the metal sulfides include titanium sulfide ($TiS_2$), molybdenum sulfide ($MoS_2$), iron sulfide ($FeS$, $FeS_2$), copper sulfide ($CuS$), and nickel sulfide ($Ni_3S_2$).

Other examples of the metal oxides include bismuth oxide ($Bi_2O_3$) and bismuth lead oxide ($Bi_2Pb_2O_5$).

Examples of the non-metallic sulfides include organic disulfide compounds and carbon sulfide compounds.

In addition to the above compounds, niobium selenide ($NbSe_3$), metal indium, and sulfur can also be used as the positive electrode active material.

The positive electrode mix may further comprise a conductive additive.

The conductive additive is the same as that described above with regard to the negative electrode mix.

The blending ratio of the solid electrolyte and the positive electrode active material in the positive electrode mix, the content of the conductive additive, and the method for producing the positive electrode mix are the same as those described above with regard to the negative electrode mix.

[Lithium Ion Battery]

The lithium ion battery according to one embodiment of the invention comprises at least one of the above-mentioned sulfide solid electrolyte and electrode mixes of the invention, or is produced from at least one of the sulfide solid electrolyte and electrode mixes of the invention.

The configuration of the lithium ion battery is not limited, but generally has a structure in which a negative electrode layer, an electrolyte layer, and a positive electrode layer are laminated in this order.

Hereinafter, each layer of the lithium ion battery is described.

(1) Negative Electrode Layer

The negative electrode layer is preferably produced from the negative electrode mix of the Invention.

Alternatively, the negative electrode layer preferably comprises the negative electrode mix of the invention.

The thickness of the negative electrode layer is preferably 100 nm or more and 5 mm or less, more preferably 1 μm or more and 3 mm or less, and further preferably 5 μm or more and 1 mm or less.

The negative electrode layer can be produced by a known method, e.g. a coating method or an electrostatic method (such as an electrostatic spray method and an electrostatic screen method).

(2) Electrolyte Layer

The electrolyte layer comprises a solid electrolyte or is produced from a solid electrolyte. The above solid electrolyte is not limited, but is preferably the sulfide solid electrolyte of the invention.

The electrolyte layer may consist solely of a solid electrolyte and may further comprise a binder. As the above binder, the same binder as that for the negative electrode mix of the invention can be used.

The thickness of the electrolyte layer is preferably 0.001 mm or more and 1 mm or less.

The solid electrolyte of the electrolyte layer may be fused. Fusion means that part of solid electrolyte particles dissolves and the dissolved part is integrated with the other solid electrolyte particles. Further, the electrolyte layer may be a plate-like body of a solid electrolyte. The above plate-like body also encompasses cases where part or all of solid electrolyte particles dissolves to form a plate-like body.

The electrolyte layer can be produced by a known method, e.g. a coating method or an electrostatic method (such as an electrostatic spray method and an electrostatic screen method).

(3) Positive Electrode Layer

The positive electrode layer comprises a positive electrode active material, and preferably comprises the positive electrode mix of the invention or is produced from the positive electrode mix of the invention.

The thickness of the positive electrode layer is preferably 0.01 mm or more and 10 mm or less.

The positive electrode layer can be produced by a known method, e.g. a coating method or an electrostatic method (such as an electrostatic spray method and an electrostatic screen method).

(4) Current Collector

The lithium ion battery of this embodiment preferably further comprises current collectors. For example, the negative electrode current collector is provided on the opposite side to the electrolyte layer side of the negative electrode layer and the positive electrode current collector is provided on the opposite side to the electrolyte layer side of the positive electrode layer.

As the current collectors, e.g. plate-like bodies and foil-like bodies comprising copper, magnesium, stainless steel, titanium, iron, cobalt, nickel, zinc, aluminum, germanium, indium, lithium, or an alloy thereof, etc. can be used.

The lithium ion battery of this embodiment can be produced by laminating and bonding the respective members mentioned above. As the bonding method, there are a method in which the respective members are laminated, pressurized and pressure-bonded, a method in which pressurization is conducted while passing between two rolls (roll to roll), and the like.

In addition, the bonding surface may be bonded via an active material having ion conductivity or an adhesive substance not inhibiting ion conductivity.

In bonding, heating and fusing may be carried out within a range in which the crystal structure of the solid electrolyte does not change.

Further, the lithium ion battery of this embodiment can also be produced by sequentially forming the respective members mentioned above. The lithium ion battery of this embodiment can be produced by a known method, e.g. a coating method or an electrostatic method (such as an electrostatic spray method and an electrostatic screen method).

EXAMPLES

Hereinbelow, the Invention will be explained in more detail in accordance with the Examples.

The evaluation methods are as follows:

(1) Measurement of Ion Conductivity and Electron Conductivity

The sulfide solid electrolyte prepared in each example was filled in a tablet molding machine and a pressure of 407 MPa (press indication value 22 MPa) was applied by using a minipress machine to obtain a molded body. As the electrode, a carbon was put on the both sides of the molded body, and a pressure was applied again by a tablet molding machine, by which a molded body for measurement (diameter about 10 mm, thickness: 0.1 to 0.2 cm) was prepared. For this molded body, an ion conductivity was measured by AC impedance measurement. The numerical value at 25° C. was adopted as the conductivity value.

In the ion conductivity measuring method used in this example, when the ion conductivity is less than $1.0\times10^{-6}$ S/cm, the ion conductivity could not be precisely measured and was therefore determined to be unmeasurable.

Further, the electronic conductivity of this molded body was measured by direct current electric measurement. As for the value of the electronic conductivity, a numerical value at 25° C. was adopted. When the electronic conductivity when a voltage of 5 V was applied was less than $1.0\times10^{-6}$ S/cm, the electron conductivity was determined to be unmeasurable.

(2) Measurement of X-Ray Diffraction (XRD) Measurement

A circular pellet having a diameter of 10 mm and a height of 0.1 to 0.3 cm was molded from the powder of the sulfide solid electrolyte produced in each example to prepare a sample. This sample was measured without touching the air using an air-tight holder for XRD. The 2θ position of the diffraction peak was determined by the centroid method using an XRD analysis program JADE.

Measurement was conducted under the following conditions using a powder X-ray diffractometer SmartLab manufactured by Rigaku Corporation.
Tube voltage: 45 kV
Tube current: 200 mA
X-ray wavelength: CuKα rays (1.5418 Å)
Optical system: Parallel beam system
Slit configuration: Solar slit 5°, incident slit: 1 mm, light receiving slit 1 mm
Detector: Scintillation counter
Measurement range: 2θ=10-60 deg
Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

In the peak intensity, one peak intensity of the argyrodite-type crystal structure existing at 2θ=29.7±0.5 deg and two peak intensities of the $Li_3PS_4$ crystal structure existing at 2θ=17.6±0.4 deg and 18.1±0.4 deg were analyzed by the following procedure, and the intensity ratio was calculated.

Smoothing was carried out by moving average of 5 points of measured data, and the lowest intensity point between 16.5 and 17.5 deg was taken as the background and subtracted from the measured data. Thereafter, the maximum value of the measured data between the maximum values of the measured data at 17.0 to 17.8 deg and 17.9 to 18.5 deg was calculated, and the smaller peak intensity was used as the peak intensity of the $Li_3PS_4$ crystal structure. In addition, the maximum value of the measured data at 29.0 to 32.0 deg was calculated as the peak intensity of the argyrodite-type crystal structure.

(3) ICP Measurement

Powders of the sulfide solid electrolyte prepared in each example were weighed and collected in a vial bottle in an argon atmosphere. A KOH alkaline aqueous solution was placed in the vial bottle, and the sample was dissolved while paying attention to the collection of the sulfur content, and the resultant was appropriately diluted to prepare a measurement solution. This solution was measured by means of a Paschen Runge type ICP-OES apparatus (SPECTRO ARCOS manufactured by SPECTRO Japan), and the composition was determined.

For the calibration solution, Li, P, and S were prepared by using a 1000 mg/L standard solution for ICP measurement, CI and Br were prepared by using a 1000 mg/L standard solution for ion chromatography, and I was prepared by using potassium iodide (special grade reagent).

The two measurement solutions were prepared for each sample, and five measurements were conducted for each measurement solution, and the average value was calculated. The composition was determined by the average of the measured values of the two measurement solutions.

Production Example 1

(Production of Lithium Sulfide ($Li_2S$))

200 g of LiOH anhydride (manufactured by Honjo Chemical Co., Ltd.), which had been dried under an inert gas, was charged in a 500-mL separable flask equipped with a stirrer, the temperature was raised under nitrogen stream, and the internal temperature was maintained at 200° C. The nitrogen gas was switched to hydrogen sulfide gas (Sumitomo Selka Chemical Co., Ltd.), and the flow rate was set to 500 mL/min, and LiOH anhydride and hydrogen sulfide were reacted.

The water produced by the reaction was condensed and recovered by a condenser. 144 mL of water was recovered after 6 hours of reaction, and the reaction was further continued for 3 hours, but water generation was not observed.

The resulting powder was recovered and the purity and XRD were measured, and as a result, the purity was found to be 98.5%, and the peak pattern of $Li_2S$ was confirmed by XRD.

Example 1

Lithium sulfide produced in Production Example 1 (purity: 98.5%), phosphorus pentasulfide (manufactured by Thermophos International, purity: 99.9% or more), and lithium chloride (manufactured by Sigma Aldrich Co.; purity: 99%) were used as starting materials (hereinafter, the purity of each starting material was the same in all the examples). The respective raw materials were mixed such that the molar ratio of lithium sulfide ($Li_2S$), phosphorus pentasulfide ($P_2S_5$), and lithium chloride (LiCl) ($Li_2S:P_2S_5$: LiCl) became 46.8:12.7:40.5. Specifically. 0.483 g of lithium sulfide, 0.632 g of phosphorus pentasulfide, and 0.385 g of lithium chloride were mixed to obtain a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7) and the pot was completely sealed. The inside of the pot was allowed to be an argon atmosphere. The mixture was treated (mechanical milling) for 60 hours at a rotation speed of 370 rpm by means of a planetary ball mill, and glass-like powder (intermediate) was obtained. For the intermediate, the results obtained by evaluation by XRD are shown in FIG. 1. From the resulting XRD pattern, it could be confirmed that major part of the intermediate was glass. In the XRD data of the Intermediate, only the peaks of $Li_2S$ and LiCl which were the raw materials were observed.

Approximately 1.5 g of the above-mentioned intermediate powder was packed in a Tammann tube (PT2, manufactured by Tokyo Glass Instruments Co., Ltd.) in a glove box under an Ar atmosphere, and the mouth of the Tammann tube was closed with a quartz wool, and the tube was further sealed with a SUS sealed container so that no air could enter. Thereafter, the sealed container was placed in an electric furnace (FUW243PA, manufactured by AdvanTech) and heat-treated. Specifically, the temperature was raised at a rate of 2.5° C./min from room temperature to 500° C. (increased to 500° C. in 3 hours), maintained at 500° C. for 8 hours, followed by slow cooling to obtain a sulfide solid electrolyte.

The ion conductivity (σ) of the sulfide solid electrolyte was 6.9 mS/cm, and the electron conductivity was less than $10^{-6}$ S/cm.

Figure 2:
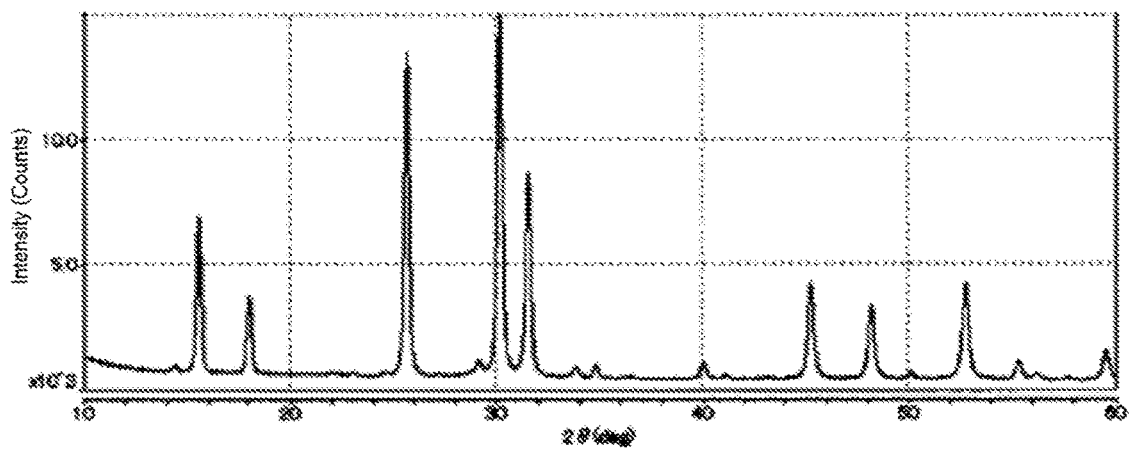
FIG. 2 is an X-ray diffraction pattern of a sulfide solid electrolyte obtained in Example 1.

The XRD pattern of the sulfide solid electrolyte is shown in FIG. 2. A peak derived from the argyrodite-type crystal structure was observed at 2θ=15.5, 18.0, 25.5, 30.0, 31.4, 45.2 and 48.0 deg. On the other hand, a peak at 17.6±0.4 deg derived from the $Li_3PS_4$ crystal structure was not observed.

The sulfide solid electrolyte was subjected to an ICP analysis, and the molar ratio of each element was measured. The results are shown in Table 1.

TABLE 1

| | Molar ratio of each element to phosphorus | | | | | |
|---|---|---|---|---|---|---|
| | a (Li/P) | b (S/P) | c (Cl/P) | a − b | a + c | Ionic conductivity (σ) (mS/cm) |
| Ex. 1 | 5.30 | 4.24 | 1.70 | 1.06 | 7.00 | 6.9 |
| Ex. 2 | 5.29 | 4.25 | 1.73 | 1.04 | 7.02 | 7.4 |
| Ex. 3 | 5.32 | 4.30 | 1.63 | 1.02 | 6.95 | 9.2 |
| Ex. 4 | 5.81 | 4.67 | 1.22 | 1.14 | 7.03 | 7.1 |
| Ex. 5 | 5.39 | 4.38 | 1.70 | 1.01 | 7.09 | 7.1 |
| Ex. 6 | 5.43 | 4.28 | 1.66 | 1.15 | 7.09 | 6.9 |
| Ex. 7 | 5.16 | 4.15 | 1.64 | 1.01 | 6.80 | 6.4 |
| Ex. 8 | 5.13 | 3.97 | 1.66 | 1.18 | 6.79 | 5.8 |
| Ex. 9 | 5.12 | 4.11 | 1.38 | 1.01 | 6.50 | 5.2 |
| Ex. 10 | 5.67 | 4.18 | 1.42 | 1.49 | 7.09 | 5.1 |
| Ex. 11 | 5.30 | 3.90 | 1.70 | 1.40 | 7.00 | 6.3 |
| Ex. 12 | 5.50 | 4.11 | 1.10 | 1.39 | 6.60 | 5.2 |
| Ex. 13 | 5.50 | 4.46 | 1.13 | 1.04 | 6.63 | 5.3 |
| Ex. 14 | 5.30 | 4.09 | 1.75 | 1.21 | 7.05 | 6.7 |
| Ex. 15 | 5.30 | 4.18 | 1.55 | 1.12 | 6.85 | 6.9 |
| Comp. Ex. 1 | 5.47 | 4.20 | 1.97 | 1.27 | 7.44 | 1.9 |
| Comp. Ex. 2 | 6.48 | 5.18 | 0.96 | 1.30 | 7.44 | 2.1 |
| Comp. Ex. 3 | 5.93 | 4.96 | 0.51 | 0.97 | 6.44 | 2.4 |
| Comp. Ex. 4 | 6.46 | 5.30 | 0.67 | 1.16 | 7.13 | 1.3 |
| Comp. Ex. 5 | 5.95 | 4.44 | 0.54 | 1.51 | 6.49 | 0.8 |
| Comp. Ex. 6 | 5.30 | 4.35 | 1.83 | 0.95 | 7.13 | 3.1 |

Example 2

A sulfide solid electrolyte was prepared and evaluated in the same manner as in Example 1, except that the treatment time by a planetary ball mill was 15 hours. The results are shown in Table 1.

As a result of the XRD measurement, a peak derived from the argyrodite-type crystal structure was observed at 2θ=15.6, 18.0, 25.6, 30.1, 31.5, 45.2 and 48.1 deg. On the other hand, a peak derived from the $Li_3PS_4$ crystal structure was not observed.

Examples 3 to 15 and Comparative Examples 1 to 6

A sulfide solid electrolyte was prepared and evaluated in the same manner as in Example 2, except that the composition of the raw materials, the conditions of mechanical milling and the heat treatment conditions of intermediate were changed as shown in Table 2. The results are shown in Table 1.

For the results of the XRD measurement, in Example 3, a peak derived from the argyrodite-type crystal structure was observed at 2θ=15.1, 18.0, 25.4, 29.9, 31.3, 44.9 and 47.8 deg. On the other hand, a peak derived from the $Li_3PS_4$ crystal structure was not observed.

In Comparative Example 1, a peak derived from the argyrodite-type crystal structure was observed at 2θ=15.5, 17.7, 25.5, 30.0, 31.4, 44.8 and 48.0 deg. On the other hand, a peak derived from the $Li_3PS_4$ crystal structure was not observed.

TABLE 2

| | Amount of raw materials (g) | | | Mechanical milling conditions | | Heat treatment conditions | |
|---|---|---|---|---|---|---|---|
| | $Li_2S$ | $P_2S_5$ | LiCl | Rotation speed (rpm) | Treatment time (h) | Treatment temperature (° C.) | Treatment time (h) |
| Ex. 1 | 0.483 | 0.632 | 0.385 | 370 | 60 | 500 | 8 |
| Ex. 2 | 0.483 | 0.632 | 0.385 | 370 | 15 | 500 | 8 |
| Ex. 3 | 0.492 | 0.626 | 0.382 | 370 | 60 | 500 | 8 |
| Ex. 4 | 0.584 | 0.628 | 0.288 | 370 | 60 | 500 | 8 |
| Ex. 5 | 0.492 | 0.626 | 0.382 | 370 | 60 | 430 | 8 |
| Ex. 6 | 0.492 | 0.626 | 0.382 | 370 | 60 | 430 | 8 |
| Ex. 7 | 0.483 | 0.632 | 0.385 | 370 | 60 | 430 | 8 |
| Ex. 8 | 0.474 | 0.637 | 0.389 | 370 | 60 | 430 | 8 |
| Ex. 9 | 0.542 | 0.624 | 0.333 | 370 | 60 | 430 | 8 |
| Ex. 10 | 0.517 | 0.625 | 0.358 | 370 | 60 | 430 | 8 |
| Ex. 11 | 0.474 | 0.637 | 0.389 | 370 | 60 | 430 | 8 |
| Ex. 12 | 0.617 | 0.622 | 0.261 | 370 | 60 | 430 | 8 |
| Ex. 13 | 0.602 | 0.633 | 0.266 | 370 | 60 | 430 | 8 |
| Ex. 14 | 0.467 | 0.627 | 0.407 | 370 | 60 | 430 | 8 |
| Ex. 15 | 0.517 | 0.625 | 0.358 | 370 | 60 | 500 | 8 |
| Comp. Ex. 1 | 0.477 | 0.607 | 0.417 | 370 | 60 | 500 | 8 |
| Comp. Ex. 2 | 0.670 | 0.601 | 0.229 | 370 | 60 | 500 | 8 |

TABLE 2-continued

|  | Amount of raw materials (g) | | | Mechanical milling conditions | | Heat treatment conditions | |
|---|---|---|---|---|---|---|---|
|  | | | | Rotation speed | Treatment time | Treatment temperature | Treatment time |
|  | $Li_2S$ | $P_2S_5$ | LiCl | (rpm) | (h) | (° C.) | (h) |
| Comp. Ex. 3 | 0.726 | 0.650 | 0.124 | 370 | 60 | 500 | 8 |
| Comp. Ex. 4 | 0.741 | 0.618 | 0.141 | 370 | 60 | 500 | 8 |
| Comp. Ex. 5 | 0.765 | 0.617 | 0.118 | 370 | 60 | 500 | 8 |
| Comp. Ex. 6 | 0.456 | 0.648 | 0.396 | 370 | 60 | 500 | 8 |

Comparative Example 7

The respective raw materials were mixed such that the molar ratio of lithium sulfide ($Li_2S$), phosphorus pentasulfide ($P_2S_5$) and lithium chloride (LiCl) ($Li_2S:P_2S_5:LiCl$) used in Example 1 became 1.9:0.5:1.6.

The raw material mixture and 30 g of zirconia balls having a diameter of 10 mm were placed in a zirconia pot (45 mL) of a planetary ball mill (manufactured by Fritsch Co., Ltd., model No. P-7) and the pot was completely sealed. The inside of the pot was allowed to be an argon atmosphere. Mixing was conducted by the planetary ball mill to such an extent that the crystallinity of the raw material powder can be maintained, thereby to obtain a mixed powder.

Figure 3:
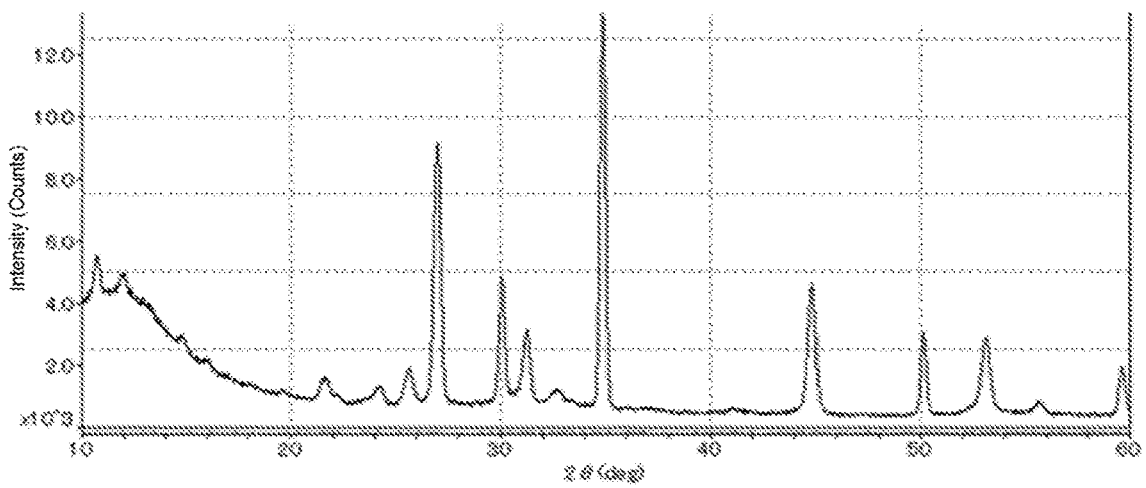
FIG. 3 is an X-ray diffraction pattern of mixed powder in Comparative Example 7.

The XRD pattern of the resulting mixed powder is shown in FIG. 3. In the resulting XRD pattern, the peaks of $Li_2S$, $P_2S_5$ and LiCl as the raw materials could be confirmed, and the crystallinity of the raw material powder was maintained.

In a glove box in an Ar atmosphere, about 1.5 g of powder of the above-mentioned mixed powder was filled in a glass tube provided with sealing function. In order to prevent entering of air, the front end of the glass tube was sealed with a dedicated jig. Thereafter, the glass tube was set in an electric furnace. The dedicated jig was inserted into a joint in the electric furnace, connected with a gas circulation tube, and subjected to a heat treatment while circulating hydrogen sulfide at a flow rate of 20 mL/min. Specifically, the temperature was elevated from room temperature to 500° C. at a rate of 2.5° C./min (heated to 500° C. for 3 hours), and retained at 500° C. for 4 hours. Thereafter, the glass tube was gradually cooled, by which a sulfide solid electrolyte was obtained.

The resulting sulfide solid electrolyte was subjected to an ICP analysis, and the molar ratio of each element was measured. The ion conductivity was also measured. As a result, a (Li/P)=5.4, b (S/P)=4.4, c (Cl/P)=1.6, and the ion conductivity ($\sigma$) was 2.7 mS/cm.

Example 16

In addition to lithium sulfide ($Li_2S$), phosphorus pentasulfide ($P_2S_5$) and lithium chloride (LiCl) which were the raw materials used in Example 1, lithium iodide (LiI: manufactured by Sigma Aldrich Co. Ltd., purity: 99%) was further used as the raw material. The respective raw materials were mixed such that the molar ratio thereof ($Li_2S:P_2S:LiCl:LiI$) became 46.8:12.7:38.0:2.5. Specifically, 0.467 g of lithium sulfide, 0.610 g of phosphorus pentasulfide, 0.349 g of lithium chloride, and 0.074 g of lithium iodide were mixed to obtain a raw material mixture.

By using the resulting raw material mixture, a sulfide solid electrolyte was produced under the same mechanical milling conditions and heat treatment conditions as Example 1. The ion conductivity ($\sigma$) of the resulting sulfide solid electrolyte was 5.5 mS/cm. The electron conductivity was less than $10^{-6}$ S/cm.

For the resulting sulfide solid electrolyte, as a result of the XRD measurement, a peak derived from the argyrodite-type crystal structure was observed.

As a result of the ICP analysis, the molar ratio, a (Li/P), was 5.38, the molar ratio, b (S/P), was 4.36 and the molar ratio "c ((Cl+I)/P)" was 1.70.

Although some embodiments and/or examples of the invention are described in detail above, it is easy for the person skilled in the art, without substantively departing from the novel teachings and effects of the invention, to make many modifications to the exemplary embodiments and/or examples thereof. Accordingly, these many modifications are included in the scope of this invention.

The contents of the specification under the Japanese application, on which the priority right of the present application under the Paris Convention is based, are cited herein in their entirety.

The invention claimed is:

1. A sulfide solid electrolyte, comprising lithium, phosphorus, sulfur and at least one element X selected from the group consisting of a halogen element and a chalcogen element excluding sulfur, wherein:

the sulfide solid electrolyte comprises an argyrodite-type crystal structure;

a molar ratio of the lithium to the phosphorus, A (Li/P), a molar ratio of the sulfur to the phosphorus, B (S/P), and a molar ratio of the element X to the phosphorus, C (X/P), satisfy formulas (1) to (3):

$$5.0 \leq A \leq 7.1 \quad (1)$$

$$1.0 < A - B \leq 1.5 \quad (2)$$

$$6.5 \leq A + C < 7.1 \quad (3); \text{ and}$$

B>0 and C>0.

2. The sulfide solid electrolyte according to claim 1, comprising a composition represented by formula (4):

$$Li_a(P_{1-z}M_z)S_bX_c \quad (4),$$

wherein:

M is one or more of elements selected from the group consisting of Si, Ge, Sn, Pb, B, Al, Ga, As, Sb and Bi;

X is one or more of elements selected from the group consisting of F, Cl, Br, I, O, Se and Te;

a is A(1−z);

b is B(1−z);

c is C(1−z); and z satisfies 0≤z≤0.3.

3. The sulfide solid electrolyte according to claim 2, wherein the X is one or more of halogen elements selected from the group consisting of F, Cl, Br and I.

4. The sulfide solid electrolyte according to claim 1, wherein diffraction peaks are measured at 2θ=25.2 ±0.5 deg and 29.7±0.5 deg in a powder X-ray diffraction of the sulfide solid electrolyte using CuKα rays.

5. An electrode mix, comprising the sulfide solid electrolyte of claim 1 and an active material.

6. A lithium ion battery, comprising the sulfide solid electrolyte of claim 1.

7. An electrode mix produced from the sulfide solid electrolyte of claim 1.

8. A lithium ion battery produced from the electrode mix according to claim 7.

9. A lithium ion battery, comprising the electrode mix of claim 5.

10. The sulfide solid electrolyte according to claim 1, wherein the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br, I, O, Se and Te;
a is A(1−z);
b is B(1−z);
c is C(1−z); and
z is 0.

11. The sulfide solid electrolyte according to claim 1, wherein the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br and I;
a is A(1−z);
b is B(1−z);
c is C(1−z); and
z satisfies 0≤z≤0.3.

12. The sulfide solid electrolyte according to claim 1, wherein the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of halogen elements selected from the group consisting of Cl and Br;
a is A(1−z);
b is B(1−z);
c is C(1−z); and
z satisfies 0≤z≤0.3.

13. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br, I, O, Se and Te;
a is A(1−z);
b is B(1−z);
c is C(1−z); and
z satisfies 0≤z≤0.3; and
diffraction peaks are measured at 2θ=25.2±0.5 deg and 29.7±0.5 deg in a powder X-ray diffraction of the sulfide solid electrolyte using CuKα rays.

14. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br, I, O, Se and Te;
a is A(1−z);
b is B(1−z);
c is C(1−z); and
z satisfies 0≤z≤0.3; and
the sulfide solid electrolyte does not have a diffraction peak at 2θ=17.6±0.4 deg and 2θ=18.1±0.4 deg in powder X-ray diffraction using CuKα rays, or the sulfide solid electrolyte has a diffraction peak at 2θ=17.6±0.4 deg and 2θ=18.1±0.4 deg in powder X-ray diffraction using CuKα rays and satisfies formula (5):

$$0<I_A/I_B<0.05 \qquad (5)$$

wherein:
$I_A$ represents the intensity of the diffraction peak which is not a diffraction peak derived from the argyrodite-type crystal structure between diffraction peaks at 2θ=17.6±0.4 deg and 2θ=18.1±0.4 deg; and
$I_B$ represents the intensity of the diffraction peak at 2θ=29.7±0.5 deg.

15. The sulfide solid electrolyte according to claim 1, wherein the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br and I;
a is A(1−z);
b is B(1−z);
c is C(1−z); and
z is 0.

16. The sulfide solid electrolyte according to claim 1, wherein the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of halogen elements selected from the group consisting of Cl and Br;
a is A(1−z);
b is B(1−z);
c is C(1−z); and
z is 0.

17. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br, I, O, Se and Te;
a is A(1−z);
b is B(1−z);
c is C(1−z) and
z is 0; and
diffraction peaks are measured at 2θ=25.2±0.5 deg and 29.7±0.5 deg in a powder X-ray diffraction of the sulfide solid electrolyte using CuKα rays.

18. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of elements selected from the group consisting of F, Cl, Br, I, O, Se and Te;
a is A(1−z);
b is B(1−z);
c is C(1−z); and
z is 0; and
the sulfide solid electrolyte does not have a diffraction peak at 2θ=17.6±0.4 deg and 2θ=18.1±0.4 deg in powder X-ray diffraction using CuKα rays, or the sulfide solid electrolyte has a diffraction peak at 2θ=17.6±0.4 deg and 2θ=18.1±0.4 deg in powder X-ray diffraction using CuKα rays and satisfies formula (5):

$$0 < I_A/I_B < 0.05 \qquad (5)$$

wherein:
$I_A$ represents the intensity of the diffraction peak which is not a diffraction peak derived from the argyrodite-type crystal structure between diffraction peaks at 2θ=17.6±0.4 deg and 2θ=18.1±0.4 deg; and
$I_B$ represents the intensity of the diffraction peak at 2θ=29.7±0.5 deg.

19. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of halogen elements selected from the group consisting of Cl and Br;
a is A(1−z);
b is B(1−z);
c is C(1−z); and
z satisfies 0≤z≤0.3; and
diffraction peaks are measured at 2θ=25.2±0.5 deg and 29.7±0.5 deg in a powder X-ray diffraction of the sulfide solid electrolyte using CuKα rays.

20. The sulfide solid electrolyte according to claim 1, wherein:
the sulfide solid electrolyte comprising a composition represented by formula (4):

$$Li_a(P_{1-z}M_z)S_bX_c \qquad (4)$$

wherein:
M is one or more of elements selected from the group consisting of Si, Ge, Sn, Pb, B, Al, Ga, As, Sb and Bi;
X is one or more of halogen elements selected from the group consisting of Cl and Br;
a is A(1−z);
b is B(1−z);
c is C(1−z); and
z satisfies 0≤z≤0.3; and
the sulfide solid electrolyte does not have a diffraction peak at 2θ=17.6±0.4 deg and 2θ=18.1±0.4 deg in powder X-ray diffraction using CuKα rays, or the sulfide solid electrolyte has a diffraction peak at 2θ=17.6±0.4 deg and 2θ=18.1±0.4 deg in powder X-ray diffraction using CuKα rays and satisfies formula (5):

$$0 < I_A/I_B < 0.05 \qquad (5)$$

wherein:
$I_A$ represents the intensity of the diffraction peak which is not a diffraction peak derived from the argyrodite-type crystal structure between diffraction peaks at 2θ=17.6±0.4 deg and 2θ=18.1±0.4 deg; and
$I_B$ represents the intensity of the diffraction peak at 2θ=29.7±0.5 deg.

21. The sulfide solid electrolyte according to claim 1, wherein:
diffraction peaks are measured at 2θ=25.2±0.5 deg and 29.7±0.5 deg in a powder X-ray diffraction of the sulfide solid electrolyte using CuKα rays; and
the sulfide solid electrolyte does not have a diffraction peak at 2θ=17.6±0.4 deg and 2θ=18.1±0.4 deg in powder X-ray diffraction using CuKα rays, or the sulfide solid electrolyte has a diffraction peak at 2θ=17.6±0.4 deg and 2θ=18.1±0.4 deg in powder X-ray diffraction using CuKα rays and satisfies formula (5):

$$0 < I_A/I_B < 0.05 \qquad (5)$$

wherein:
$I_A$ represents the intensity of the diffraction peak which is not a diffraction peak derived from the argyrodite-type crystal structure between diffraction peaks at 2θ=17.6±0.4 deg and 2θ=18.1±0.4 deg; and
$I_B$ represents the intensity of the diffraction peak at 2θ=29.7±0.5 deg.

22. The sulfide solid electrolyte according to claim 1, wherein the molar ratio of the lithium to the phosphorus, A (Li/P), the molar ratio of the sulfur to the phosphorus, B (S/P), and the molar ratio of the element X to the phosphorus, C (X/P), satisfy formulas (1') to (5'):

$$5.12 \leq A \leq 5.81 \quad (1')$$

$$3.90 \leq B \leq 4.67 \quad (2')$$

$$1.10 \leq C \leq 1.75 \quad (3')$$

$$1.0 < A-B \leq 1.5 \quad (4')$$

$$6.5 \leq A+C < 7.1 \quad (5').$$

* * * * *